US009789831B2

(12) United States Patent
Trollope et al.

(10) Patent No.: US 9,789,831 B2
(45) Date of Patent: Oct. 17, 2017

(54) METHOD OF MANAGING COLLISIONS BETWEEN A PLURALITY OF VEHICLES AND VEHICLE APPLYING SUCH A METHOD

(71) Applicant: Coventry University, Coventry, West Midlands (GB)

(72) Inventors: James Trollope, Coventry (GB); Keith Burnham, Coventry (GB)

(73) Assignee: Coventry University, Coventry, West Midlands (GB)

( * ) Notice: Subject to any disclaimer, the term of this patent is extended or adjusted under 35 U.S.C. 154(b) by 0 days.

(21) Appl. No.: 15/038,203

(22) PCT Filed: Nov. 20, 2014

(86) PCT No.: PCT/GB2014/053442
§ 371 (c)(1),
(2) Date: May 20, 2016

(87) PCT Pub. No.: WO2015/075461
PCT Pub. Date: May 28, 2015

(65) Prior Publication Data
US 2016/0368440 A1    Dec. 22, 2016

(30) Foreign Application Priority Data
Nov. 20, 2013   (GB) .................................. 1320489.6

(51) Int. Cl.
*B60R 22/00*     (2006.01)
*B60R 19/02*     (2006.01)
(Continued)

(52) U.S. Cl.
CPC ............ *B60R 19/023* (2013.01); *B60R 19/03* (2013.01); *B60R 19/483* (2013.01);
(Continued)

(58) Field of Classification Search
USPC .......................................................... 701/45
See application file for complete search history.

(56) References Cited

U.S. PATENT DOCUMENTS

| 7,046,167 B2 | 5/2006 | Rao et al. |
| 2002/0099485 A1 | 7/2002 | Browne et al. |
(Continued)

FOREIGN PATENT DOCUMENTS

| WO | 2010078988 | 7/2010 |
| WO | 2011073049 | 6/2011 |

OTHER PUBLICATIONS

International Search Report, dated Feb. 16, 2015, from corresponding PCT Application No. PCT/GB2014/053442.
(Continued)

*Primary Examiner* — Tyler Paige
(74) *Attorney, Agent, or Firm* — Brient Globerman, LLC

(57) ABSTRACT

A method of managing collisions, the method comprising: identifying a first crash structure (22) and determining an initial stiffness of the crash structure; determining a level of aggressivity of the collision based on the predicted energy absorption for each vehicle; identifying a first crash structure whose stiffness can be adjusted, and determining a subsequent stiffness value for the crash structure based on the determined amount of energy to be absorbed by each of the vehicles such that the energy absorbed by the crash structure is changed and the level of aggressivity is reduced; and stiffening the first crash structure to the determined stiffness value.

18 Claims, 10 Drawing Sheets

(51) Int. Cl.
  *B62D 21/15*   (2006.01)
  *B60R 19/03*   (2006.01)
  *B60R 19/48*   (2006.01)
  B60R 19/00    (2006.01)
  B60R 21/01    (2006.01)
(52) U.S. Cl.
  CPC ...... *B62D 21/152* (2013.01); *B60R 2019/007* (2013.01); *B60R 2021/01252* (2013.01)

(56) References Cited

U.S. PATENT DOCUMENTS

| | | |
|---|---|---|
| 2002/0169533 A1 | 11/2002 | Browne et al. |
| 2004/0061598 A1 | 4/2004 | King |
| 2004/0088091 A1 | 5/2004 | Buechele et al. |
| 2004/0117086 A1 | 6/2004 | Rao et al. |
| 2004/0254729 A1 | 12/2004 | Browne et al. |
| 2005/0021192 A1* | 1/2005 | Takafuji ............. B60R 21/0136 701/1 |
| 2008/0011536 A1* | 1/2008 | Pipkorn ................. B60R 19/36 180/274 |
| 2011/0130111 A1* | 6/2011 | Crandall ............... B60R 21/013 455/404.1 |
| 2012/0197489 A1 | 8/2012 | Freienstein et al. |
| 2013/0054093 A1* | 2/2013 | Furst .................. B60R 21/0132 701/45 |
| 2016/0368440 A1* | 12/2016 | Trollope ............... B60R 19/023 |

OTHER PUBLICATIONS

Written Opinion, dated Feb. 16, 2015, from corresponding PCT Application No. PCT/GB2014/053442.
Search Report, dated Jun. 18, 2014, from corresponding GB Application No. GB1320489.6.

* cited by examiner

METHOD OF MANAGING COLLISIONS BETWEEN A PLURALITY OF VEHICLES AND VEHICLE APPLYING SUCH A METHOD

CROSS-REFERENCE TO RELATED PATENT APPLICATIONS

This application is a national phase entry of International Application No. PCT/GB2014/053442, filed Nov. 20, 2014, entitled "Method of Managing Collisions Between a Plurality of Vehicles and Vehicle Applying Such a Method," which claims priority to United Kingdom Patent Application No. GB1320489.6, filed Nov. 20, 2013, entitled "Active Buckling Control," the entire disclosures of which are incorporated herein by referenced in their entirety.

FIELD OF INVENTION

The invention relates to active crash management system to manage the collision between a plurality of vehicles. In particular an active crash management system in which the stiffness of a crash structure is controlled so as to reduce the level of aggressivity in the collision involving two or more vehicles.

BACKGROUND TO THE INVENTION

Crash management systems and crash structures form a significant part of modern vehicle design. A vehicle structure is typically made up of two zones, the passenger compartment/cell and crumple zones, as illustrated in FIG. 1 for two examples, namely automotive vehicles and railway vehicles where in each case $m_a$ and $m_b$ represent the masses for vehicles A and B and $k_a$ and $k_b$ are the corresponding stiffness values for the crumple zones, respectively. The passenger compartment is the region in which the passengers are located, with this being designed to remain rigid/stiff, hence, preventing intrusion of other vehicles into the passenger compartment. The crumple zones are typically located at the front and rear of the vehicles for energy absorption in the event of a frontal or rear end collision, hence these are designed to fail in a controlled manner. The zones of the vehicle are herein referred to as crash structures. The term crash structure refers to both regions of a vehicle such as the crumple zone and passenger cell, as well as the components of these regions which absorb collision energy.

Relevant safety standards typically require a vehicle body to be able to withstand an impact with a stationary structure. However, many collisions occur between two or more vehicles. Furthermore, such vehicles may be of differing mass. For example, in a collision between a small car and a sports utility vehicle (SUV) the difference in mass between the two vehicles may be over 2 tonnes. The difference in vehicle mass in a collision may lead to the larger vehicle absorbing less energy than a smaller vehicle, which is manifest as aggressivity of the larger vehicle over the smaller.

It is known that certain materials, known as actively controlled materials (ACM), commonly referred to as smart materials, such as magnetorheological materials, piezoelectric polymers, shape memory alloys etc., can adjust their stiffness. The timescales in which the adjustment occurs is of the order of 50 ms or less. Such materials can therefore be used in vehicle crash structures (such as the front or rear end crumple zones) where the stiffness of the structure can be adjusted in the event that a collision is about to occur, i.e. adjustment is made in advance of the collision. For example U.S. Pat. No. 7,046,167, in the name of Ford Global Technologies, describes a system in which the stiffness of a vehicle changes in the event that a collision is predicted to occur. Existing systems, however, do not consider the other vehicles involved in the collision.

Accordingly to mitigate some of the above problems there is provided a method of managing collisions between a plurality of vehicles in an active collision management system, wherein one or more the of the vehicles has a crash structure whose stiffness can be adjusted and one or more object detection sensors, the method comprising the steps of: determining whether a collision event between the plurality of vehicles is to occur based on data measured by one or more object detection sensors; and in the event that a collision event is to occur, for a first vehicle involved in the collision event: identifying a first crash structure and determining an initial stiffness of the crash structure; and subsequently determining a level of aggressivity of the collision based on a predicted energy absorption as a result of the predicted collision for each of the plurality of vehicles; determining a subsequent stiffness value for the first crash structure based on the predicted energy absorption and level of aggressivity of the collision such that the energy absorbed by the crash structure is changed and the level of aggressivity of the collision is reduced; and adjustment of the stiffness of the first crash structure to the subsequently determined stiffness value. An aspect of the present invention is that there are a plurality of controlled stiffness values of the crash structures amongst the imminently colliding vehicles. This is realised via vehicle-to-vehicle and vehicle-to-vehicle (V2X) communication and exploitation of a decision maker linked to a multi-dimensional look-up table (MDLT) and nonlinear interpolation of stiffness values using fuzzy logic.

Such a system therefore allows for one or more vehicle(s) involved in a crash to compensate for the differences in vehicle masses and reduce the aggressivity of the collision. By predicting the amount of energy to be absorbed by each crash structure in advance of the collision, the stiffness of the crash structure can be adjusted so the energy absorption may be distributed more fairly between the vehicles in the collision and the overall aggressivity of the collision is reduced.

Other aspects of the invention will become apparent from the appended claim set.

BRIEF DESCRIPTION OF THE DRAWINGS

Preferred embodiments of the present invention will now be described, by way of example only, with reference to the accompanying drawings, in which:

FIG. 2 (lower plot) is a schematic representation of the desirable force versus deformation characteristic for a typical automotive vehicle collision between two vehicles of dissimilar masses using the active buckling control approach;

SUMMARY OF THE INVENTION

According to an aspect of the invention, there is provided a system which actively manages collisions between one or more vehicles. In particular an aspect of the invention is to actively control the stiffness of one or more crash structures in a vehicle prior to the event of a collision. By controlling the stiffness of a crash structure the point at which buckling of the structure occurs will change and hence the level of energy absorption within a given vehicle will be adjusted. Therefore the invention is able to control the amount of energy absorbed by each vehicle in the collision by adjusting the stiffness of the crash structures before the point of collision. By controlling the amount of energy absorbed by each vehicle, the aggressivity of the crash can be managed.

By considering the following example the need to actively manage a collision may be illustrated. The following example is illustrative and the values provided are not considered to be limiting to the invention.

Figure 1:
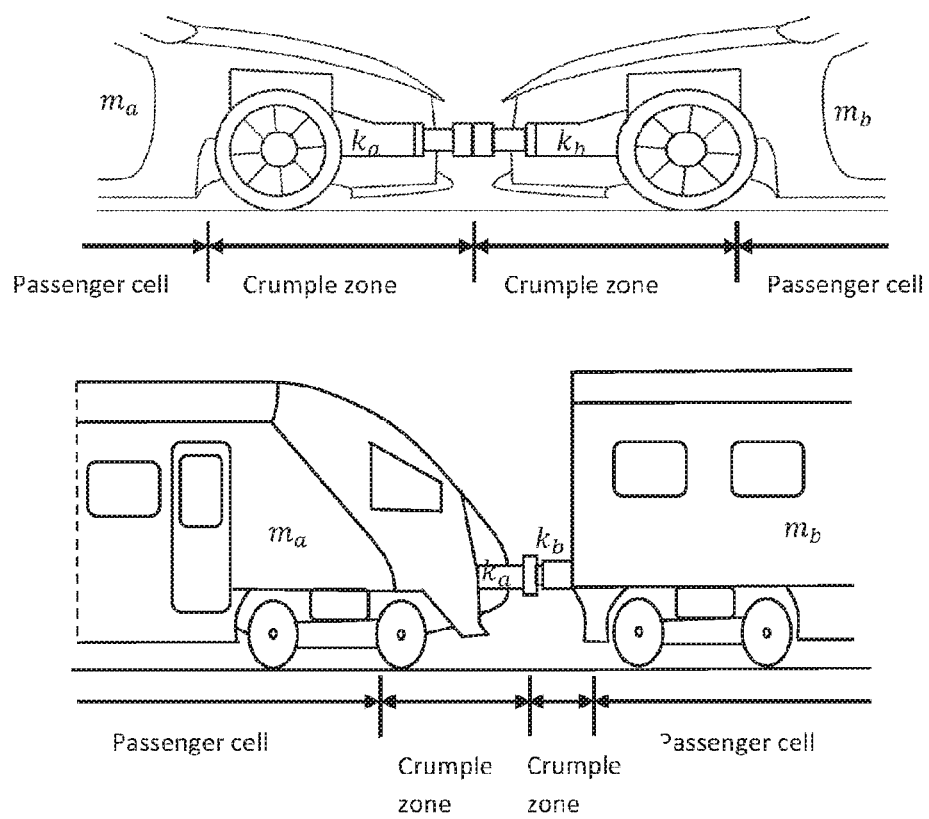
FIG. 1 is a schematic representation of two example applications of active buckling control in collisions involving two different vehicles (an automotive and railway vehicle)

Consider two vehicles, denoted Vehicle A and Vehicle B, of dissimilar mass but of similar geometry and stiffness, where the conservation of momentum and energy are considered (for example as shown in FIG. 1). For this example, Vehicle A and Vehicle B are assigned masses $m_a$ and $m_b$, these being 1000 kg and 500 kg, respectively. Immediately prior to the collision the individual vehicle velocities are given by $V_a$ and $V_b$, respectively, with the final velocity of the combined masses immediately after being denoted by $V_f$.

Consider Vehicle A travelling at 17.88 m/s (40 mph) and Vehicle B being stationary. Based on the conservation of momentum, it can be deduced that the final velocity of the combined mass of the two vehicles is 11.92 m/s (26.7 mph). Further, the principle of conservation of energy states that the kinetic energy before and after the collision must be equal. The quantity, denoted $\Delta E$, is the collision energy dissipated within the vehicle body structures (VBS); in this case it amounts to 53.3 kJ.

It is known that the ratio of absorption of energy from a collision is proportional to the change in the vehicle velocities, denoted $\Delta V_a$ and $\Delta V_b$. It can be deduced that the ratio of $\Delta V_a : \Delta V_b$ is the same as $m_b : m_a$, so that in the event of a collision, between Vehicle A and Vehicle B, the smaller vehicle becomes the more vulnerable of the two, and will absorb the larger proportion of the collision energy. The difference in mass, and accordingly the amount of collision energy absorbed gives rise to an incompatibility problem, hence aggressivity of the larger vehicle as perceived by the smaller.

Figure 2:
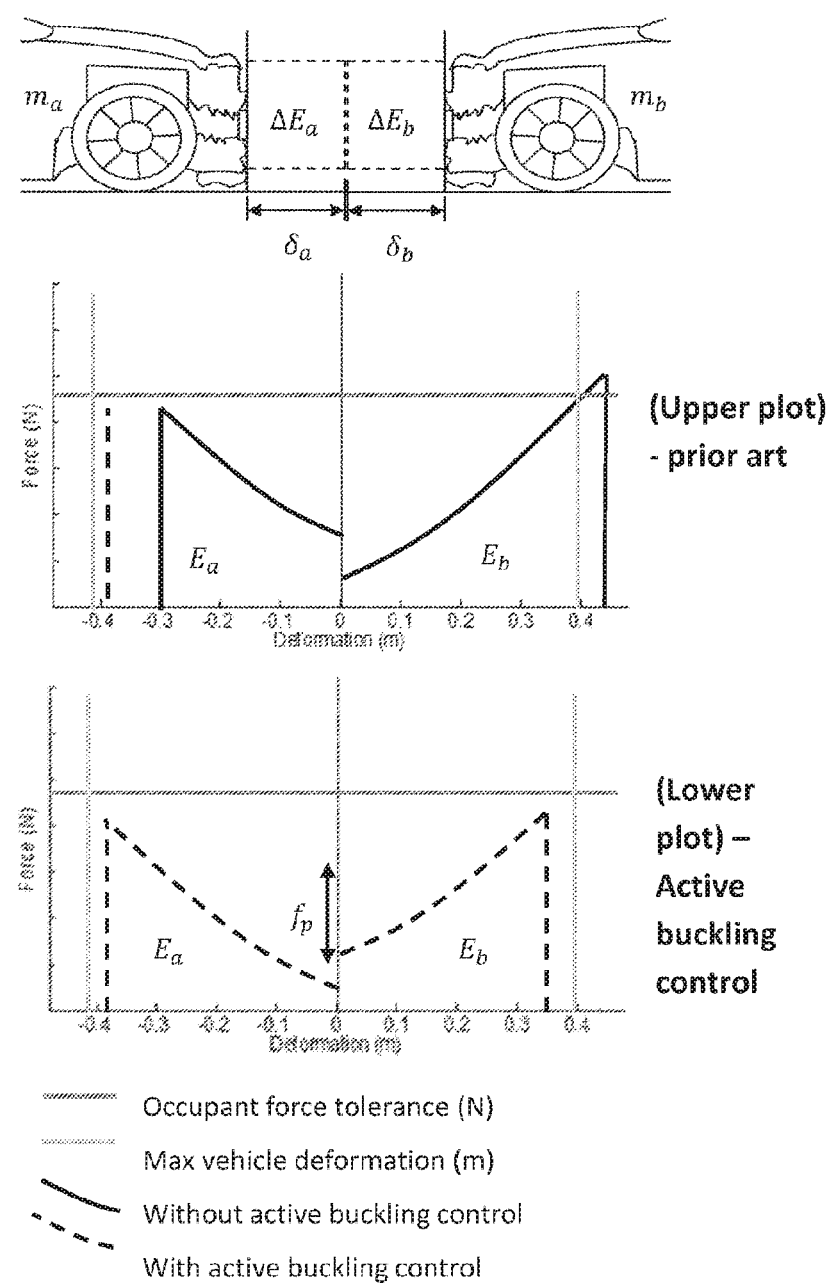
FIG. 2 (upper plot) is a schematic representation of a typical force versus deformation characteristic for a typical automotive vehicle collision between two vehicles of dissimilar masses.

FIG. 2 is a graphical representation of the example of the distribution of the energy and deformation forces in the above example.

In FIG. 2 there is shown a collision between vehicle A (left hand vehicle) and vehicle B (the right hand vehicle). The vehicles have masses $m_a$ or $m_b$ respectively and as a result of the collision have absorbed collisional energy $\Delta E_a$ and $\Delta E_b$ respectively. The crumple zones of the vehicles have undergone deformations or displacements $\delta_a$, $\delta_b$ respectively.

FIG. 2 also depicts the force versus deformation characteristic for a typical automotive vehicle collision, whereby $m_a$ is greater than $m_b$ (Note that the left hand plot corresponds to Vehicle A is 'mirrored' to aid visual interpretation). There is also shown (as the horizontal line) the occupant force tolerance which is representative of the energy an occupant in the passenger cell may experience without serious injury. In the upper there is shown the force absorbed by passive uncontrolled structures.

Hence, as is evident from the graph (upper plot), in prior art systems the smaller vehicle of the two (vehicle B) in the collision experiences the greater deformation of the passenger cell and as a result, experiences higher force levels, placing the occupants at a greater risk. As can also be seen in FIG. 2 there is a risk that the occupants in the passenger cell may experience a dangerous or even fatal force as a result the collision.

Figure 3:
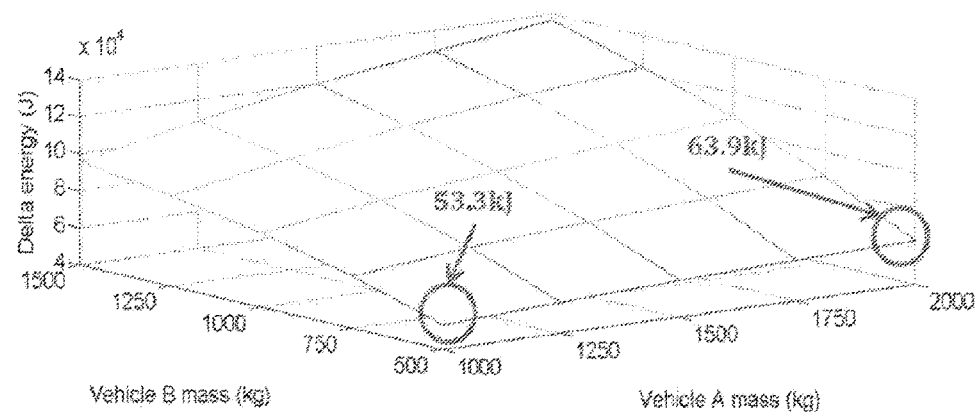
FIG. 3 is a schematic representation of illustrates a surface which represents the collision energy between two vehicles of different mass.

Further to this, FIG. 3 illustrates a surface which represents a typical collision event of two arbitrary vehicles, Vehicle A and Vehicle B, in prior art systems. In this Figure there is shown Vehicle A in the range of 1000-2000 kg and Vehicle B in the range of 500-1500 kg, corresponding to Vehicle A travelling at 17.88 m/s (40 mph) and Vehicle B being stationary (as per the above example). Vehicle A and vehicle B are of similar stiffness and geometry and FIG. 3 depicts the passive case of uncontrolled structures. The resulting collision energy $\Delta E$ absorbed in the collision is plotted vertically. This is a typical surface contained within the MDLT, with such a family of surfaces being predetermined for a range of collision velocities, denoted $V_c$, where $V_{c_s} < V_c < V_{c_l}$, with $V_{c_s}$ and $V_{c_l}$ denoting the smallest and largest collision velocities, respectively.

The example serves to illustrate that when the mass ratio is 2:1 the smaller vehicle of 500 kg would absorb 35.5 kJ of energy and the larger vehicle of 1000 kg would absorb only 17.8 kJ.

In a further example, for the same collision velocity, as above, where the ratio of masses is 4:1, it may be predetermined via the look-up table that the smaller vehicle of 500 kg would absorb 51.1 kJ compared to the larger vehicle of 2000 kg absorbing only 12.8 kJ.

Thus it is demonstrated that in such collisions, the lighter vehicle will absorb more energy than the heavier, more aggressive, vehicle. Subsequently, in collisions where the mass ratio is high, due to the aggressivity of the collision, the level of energy absorbed by the smaller vehicle may be higher than the standard to which the vehicle has been tested.

In the present invention one or more crash structures within a vehicle are constructed of ACM. In the event of an imminent collision between two or more vehicles the stiffness of the material used in the crash structures (e.g. the crumple zones) is adjusted to achieve desired stiffness values so as to change the point of buckling of the material and subsequently the energy absorbed by each vehicle. Therefore the invention utilises an active buckling control (ABC) methodology in order to manage, and thereby reduce the aggressivity of a collision. The methodology is described in more detail below.

In the lower plot of FIG. 2 there is shown the force versus deformation characteristic for a controlled structure where the stiffness of the structure can be varied in the event that a collision event is detected, according to the present invention.

FIG. 2 (lower plot) illustrate how the methodology of the present invention, ABC, can change the stiffness values of crash structures of two colliding vehicles and affect the amount of energy absorbed by the vehicles in the collision. Effectively adjusting the point of failure, denoted $f_p$, hence redistributing the share of the collision energy, tending to reverse the undesirable situation via the ABC approach.

As can be seen in the plots by actively controlling the stiffness of the crash structures (as described in further detail below) the redistribution of the collision energy can result in the collisional energy absorbed by a vehicle (vehicle B in the Figures) to be lower than the maximum force tolerance thereby preventing serious injury or death or a vehicle occupant which may otherwise occur.

Figure 4:
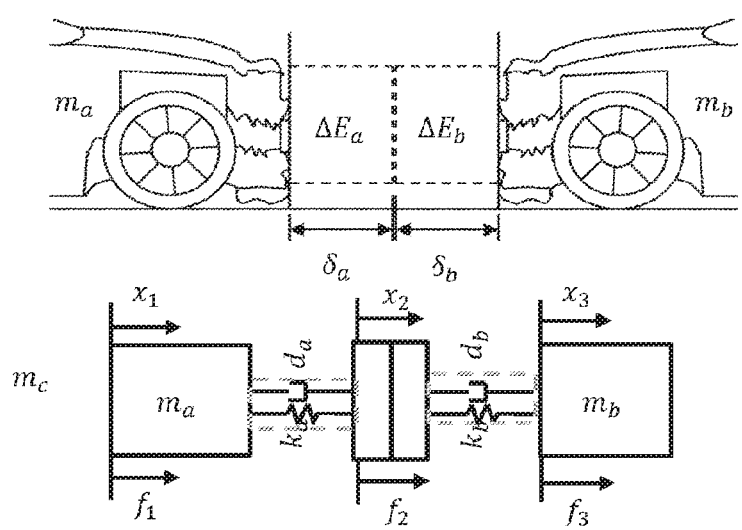
FIG. 4 is a schematic representation of a vehicle and the modal structure of the vehicle according to an aspect of the invention.

FIG. 4 is a mathematical model representation of two automotive vehicle crash structures in a full frontal collision. This is represented by a two degrees of freedom lumped parameter model, hence two structural modes, where $m_a$ and $m_b$ denote the two masses of Vehicle A and Vehicle B and $m_c$ denotes the combined masses of the two bumper assemblies, with corresponding displacements $\delta_a$, $\delta_b$ and $\delta_c$ and forces $f_a$, $f_b$ and $f_c$. The two spring stiffnesses are denoted $k_a$ and $k_b$ and $d_a$, and $d_c$ denote the two damping factors respectively.

Such mechanical properties are modelled using a modal approach based on the spectral properties of the system i.e. the eigenvalues and eigenvectors. The stiffness and dissipative damping may be actively controlled in the members of the structure. As the level of force required to trigger buckling is to be adjusted depending on the desired level of energy absorption arising from a collision, this being based around the generalised eigenvalue problem, where $\lambda$ and $v$ are the eigenvalues and eigenvectors, related to the modes and mode shapes, respectively. A given eigenvalue $\lambda$ is proportional to the buckling load of a given member, and changing the eigenvalue can be achieved by adjusting the stiffness of the material through the use of ACM. At the point where buckling of the structure commences, $\lambda$ becomes zero, corresponding to the system becoming unstable and the stiffness matrix becoming non-positive definite. Effectively, the problem reduces to specifying the smallest positive eigenvalue, i.e. the point beyond which the structure begins to buckle.

In FIG. 2 (lower plot), the value $f_p$ on the force versus deformation graph, corresponding to the buckling of a typical crumple zone of a vehicle, relates to the peak force before buckling. Hence, the peak force before buckling relates directly to the smallest positive eigenvalue, i.e. the $f_p$ value.

In effect the buckling eigenvalue $\lambda$ must be greater than some pre-defined load factor, denoted $C_l$, i.e. $\lambda > C_l$. Therefore by specifying the buckling eigenvalue, the load factor becomes an adjustable quantity being modified by making use of ACM, i.e. effectively forcing the VBS to commence buckling, via ABC, at some pre-defined desired point so that energy absorption is more appropriately managed and apportioned between the two vehicles.

In the present invention in order to change the stiffness values of the structures of a one or more vehicles requires a corresponding plurality of communicating mobile control systems, with the aim being to achieve an appropriate distribution of the collision energy dissipated between the vehicles. The problem becomes that of seeking the 'best win' situation for all parties involved in a pre-determined predicted controlled collision such that the collisional energy distribution does not adversely affect smaller vehicles. Therefore the level of aggressivity of the collision between the vehicles is managed. This feature of plurality of control of communicating mobile systems via a plurality of MDLT containing all possible collision scenarios beneficially allows the collisions between multiple vehicles to be managed.

In an embodiment the nature of the controlled collision is such that the largest vehicle with the least vulnerable passengers (in the sense that in an unmanaged collision would experience a lower force than those in the smaller vehicle, as shown in FIG. 2 upper plot) will absorb more collisional energy to allow the occupants of the smaller vehicle(s) to experience less force and allow the occupants of the vehicle a better chance of survival. Hence the least vulnerable vehicle may be seen as the master in a master-slave vehicle configuration.

Whilst the concepts described herein are given with reference to a collision involving two vehicles, these may be applied to a multiple vehicle collision scenario. For the purpose of clarity the discussion that follows is focused on the case of two vehicles only, where the mass of Vehicle A is greater than that of Vehicle B, with Vehicle A being the lead decision maker (master). The master receives information from the slave(s) vehicles concerning the physical properties if the vehicles such as structural crash properties, current velocity, orientation etc., and the master issues commands to modify the stiffness the slave crash structure (see below). The master issues commands to stiffen and/or soften the crash structures of both vehicles according to the most recently updated information regarding known properties and the predicted collision velocity and aligns for a controlled collision, preferably with full emergency braking being deployed on both vehicles.

Figure 5:
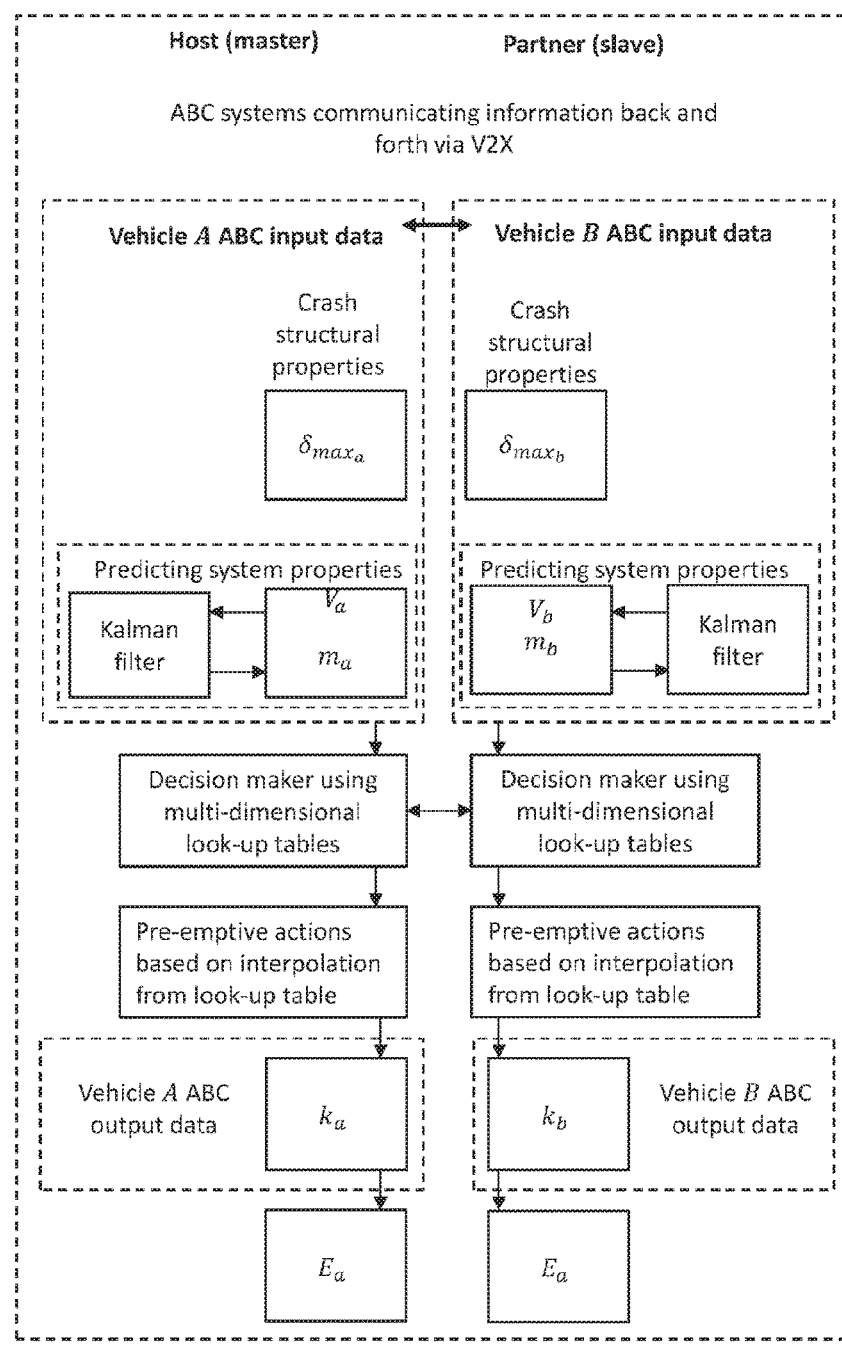
FIG. 5 is a schematic representation of two stiffness controllers communicating information back and forth via vehicle-to-infrastructure and vehicle-to-vehicle communication and then feeding into the decision maker and pre-emptive actions based on interpolation from multi-dimensional look-up table.

A description of the approach is now provided with reference to FIG. 5, which depicts two mobile communicating systems employing communicating control systems giving rise to the cooperative ABC scheme. The master defines the host vehicle, since this becomes the lead decision maker, and the slave defines the partner vehicle which provides information to, and receives commands from, the master, as described above.

Central to the approach is the ability for V2X communication on both vehicles to exchange data concerning the vehicle properties to ascertain the relative vulnerabilities. A MDLT is created for each possible collision scenario, hence crash structure properties, orientation and predictive system properties taking into environment conditions, with these feeding into an overall multi-dimensional look up table for the overall collision conditions The crash structural properties are made up of a MDLT containing all possible scenarios, this then feeds into the decision maker, along with vehicle mass and predicted collision velocity. Each vehicle employs a Kalman filter to provide updated estimates of mass as well as kinematic information on velocity and position. Depending on the vehicles a maximum deformation, denoted $\delta_{max}$, is selected, which subsequently defines the point of failure, denoted $f_p$ see FIG. 2 (lower plot), for each crash structure; $f_p$ relating to an eigenvalue which corresponds to the stiffness value. The master takes a decision as to the degree to which it absorb the collisional energy dependent on the amount of energy the slave vehicle would otherwise absorb. Accordingly, in certain collisions the master vehicle may absorb more collisional energy than would occur in passive buckling systems. The master then issues a command for the slave to stiffen whilst its crash structure softens in readiness for the collision. The point of failure is initially selected based on a 'first guess' once a controlled collision is deemed inevitable, and this is repeatedly refined up to a time interval, denoted $\Delta t$, when the stiffness values of each structure are 'frozen', immediately prior to the collision. The first guess in an embodiment is based on a predetermined value related to the known non-modified/default stiffness of the crash structure.

Such a controlled structure provides an active mechanism which tends to reverse the undesirable situation so that the collision energy which is now apportioned as $E_a$ and $E_b$, see FIG. 5, favours the smaller vehicle and its occupants, both of which would have otherwise been at a higher risk in the uncontrolled case, i.e. in the absence of ABC. The ABC system effectively converts an undesirable unsafe collision situation to a safe desirable controlled collision.

Figure 6:
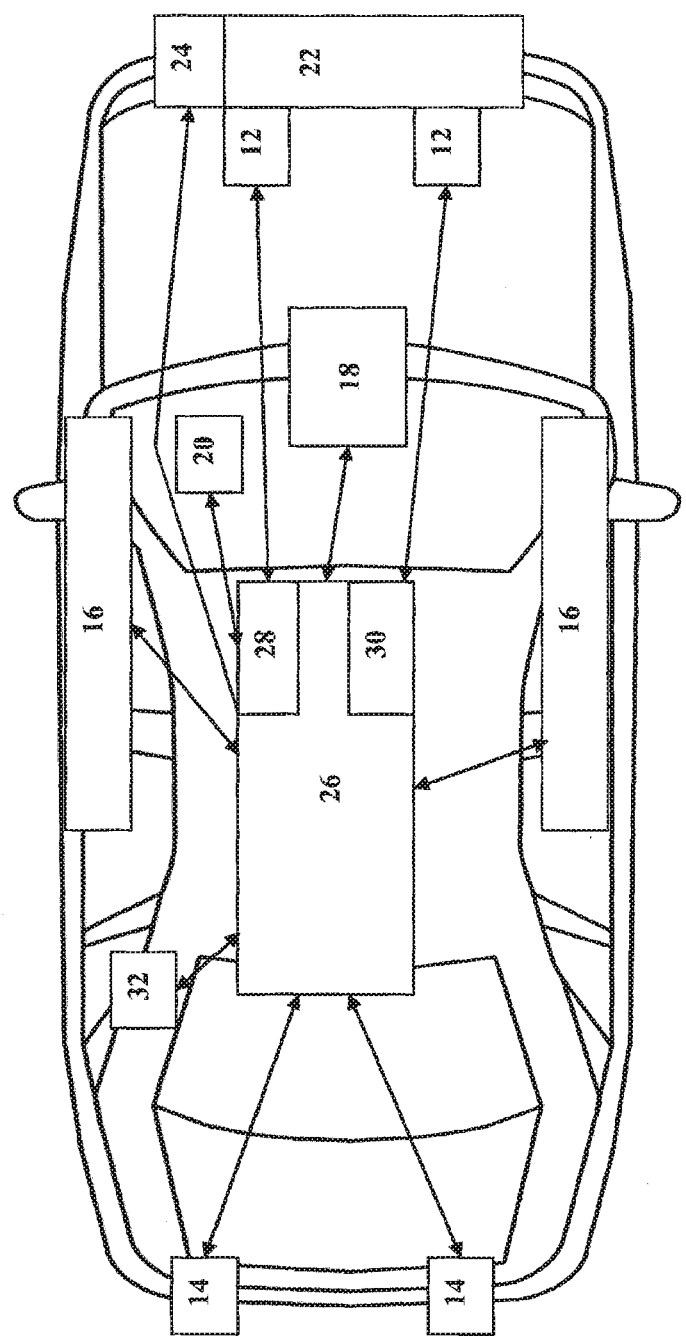
FIG. 6 is a schematic representation of a vehicle having an active buckling control system installed thereon according to an aspect of the invention.

In FIG. 6 there is shown a vehicle 10 having installed thereon active buckling control system according an aspect of the invention. For clarity purposes only a single vehicle is shown.

There is shown vehicle 10 having a front object detection sensor 12, a rear object detection sensor 14, and side object detection sensor 16. The number of, and position of, the object detection sensors (12, 14, 16) may vary according to the specifics of the installation of the invention, however for clarity purposes only, a single front, rear and side sensors are shown. There is also shown an object recognition camera 18 and a speed determining means 20. The vehicle 10 has a first crash structure 22 which is made of at least in part an ACM. The front crash structure 22 has attached thereon a stiffness controller 24 which is configured to actively change the stiffness of the ACM. The vehicle 10 further comprises a processor having an advanced driver assisted system (ADAS) 28. An active safety system (ASS) 30, and a vehicle-to-vehicle communicator 32. The vehicle 10 further comprises an on-board processor 26 configured to monitor and receive information from the object detection sensors (12, 14, 16), object recognition camera 18 and a speed determining means 20. The processor 26 is further configured to control the stiffness controller 24.

The on board processor 26 monitors information from the object detection sensors (12, 14, 16) and preferably the object recognition camera 18 in a manner which is known in ADAS systems 28. In such systems the object detection sensors and object recognition camera are used in order to identify any other vehicles, street furniture, pedestrians etc., which are in the vicinity of the vehicle 10 and to determine the likelihood of collision with any of the identified features. Such object detection and ADAS is known in the art. Preferably, the processor 26 communicates with one or more further vehicles (not shown in FIG. 6) using the vehicle-to-vehicle communicator 32. Information regarding the velocity of the vehicle as measured by the speed determining means 20, as well as further information identifying the one or more vehicles (such as make, model etc.) is transmitted using the vehicle-to-vehicle communicator 32. Such communication occurs using a standard handshake protocol in which vehicles in the vicinity of the vehicle 10 are identified, and once a connection is established bi-directional communication begins. Accordingly, using the vehicle to vehicle communicator 32 information regarding the vehicles within the vicinity of the main vehicle 10 may be easily determined. Such vehicle-to-vehicle communication occurs in a manner known in the art.

When vehicles in the vicinity of the host vehicle 10 are not equipped with vehicle-to-vehicle communication 32, the processor 26 uses the object recognition camera 18 in order to determine characteristics of the vehicle. The object recognition camera 18 and processor 26 are configured to identify, using known object detection techniques based on the shape and size of the object, characteristic, such as the likely make and model, mass etc., of the vehicle. Furthermore, using the object detection sensors (12, 14, 16) the processor 26 is also able to determine a relative velocity of the neighbouring vehicle using the information regarding the main vehicle 10 using the speed determining means 20 and the relative approach velocity as determined using the object detection sensor(s).

The processor 26 is further configured to control one or more stiffness controllers 24 of the crash structure 22. The crash structure is in part, or wholly, constructed using ACM. For clarity purposes only a first front crash structure 22 has been shown in FIG. 2, though a vehicle would typically have several such crash structures, each having a stiffness controller configured to vary the stiffness of any ACM within the crash structure 22. The processor 26 is therefore configured to adjust the stiffness of the crash structure 22 via the stiffness controller 24. In embodiments where the ACM is a piezoelectric polymer, the stiffness controller 24 has an electrical terminal and is configured to apply the appropriate voltage in order to achieve the desired stiffness of the ACM.

In a preferred embodiment, the processor 26 is also equipped with a memory (not shown) which contains information regarding a number of vehicle images and characteristics. Each vehicle identified by the object recognition camera 18 is then compared with the vehicles held in the database, using known shape matching algorithms or image comparison techniques. The database preferably also contains characteristics of the vehicle such as mass, as well as information regarding the vehicle construction e.g. stiffness of various crash structures.

In use, the processor 26 therefore obtains information regarding the vehicle 10 (such as speed as determined by the determining means 20) the current stiffness of the crash structure 22 as well as information regarding the vehicles within the vicinity as identified by the object detection sensors 12, 14 and 16 and preferably the object recognition camera 18. Furthermore, information regarding the other vehicles may be determined using the vehicle-to-vehicle communicator 32, though this is dependent on the other vehicles within the vicinity of the vehicle 10 having such functionality.

As described in further detail below, in the event that collision event is identified the processor 26 determines an initial optimal stiffness for the first crash structure 22 so as to more effectively apportion the energy absorption between the two or more vehicles involved in the collision. As is known in existing ADAS systems and ASS systems the processor 26 updates such information every 50 ms. Therefore, the processor 26 has a constantly updating awareness of the potential dangers posed to the host vehicle 10. This information is used to refine the initially determined stiffness for the crash structures, so as to compensate for any changes in the collision (e.g. changes in velocity of the vehicles involved etc.).

Figure 7:
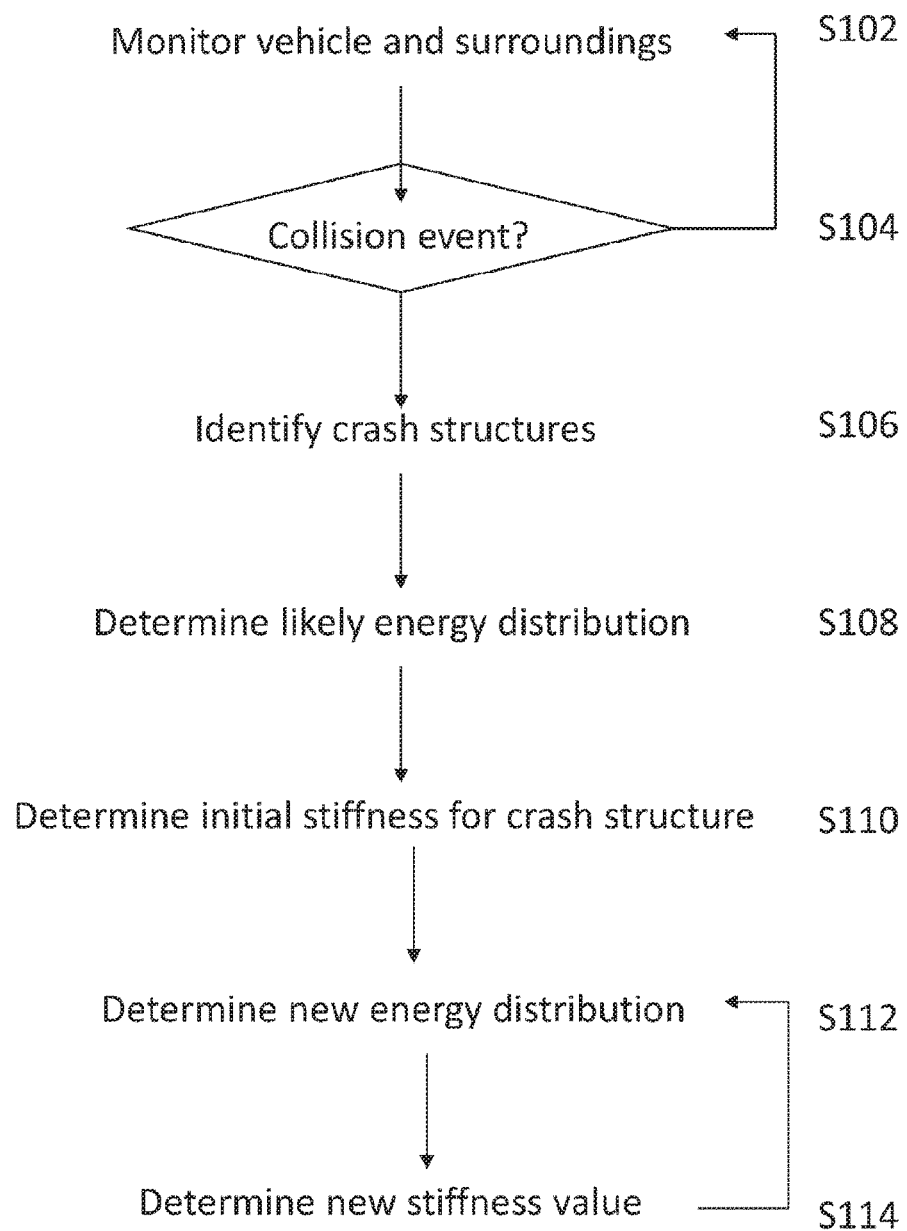
FIG. 7 is a flow chart of the process of active buckling control according to an aspect of the invention.

FIG. 7 is a flowchart of the process of the adaptive buckling control system varying the stiffness of a crash structure in the event that a collision is determined to occur.

At step S102 the on-board ADAS or similar, monitors the vehicle 10 and its surroundings. Such monitoring is known in modern car technologies and occurs in a known manner.

At step S104 it is determined whether a collision event is to occur based on the data as collected at step S102. In the event that no collision event is believed to occur the process returns to step S102 and monitoring continues in the known manner. If at step S104 a collision event is determined to occur the process continues to step S106. Known ADAS systems have collision mitigation functionalities (such as automatic emergency braking) and preferably such known steps occur at step S104 in order to prevent, or reduce the effect of, a collision.

If a collision event is then confirmed despite the mitigation actions taken, at step S106 the on-board processor determines the likely crash structures in the vehicle which will be impacted as a result of the collision. Depending on the circumstances of the collision event (speed, number of vehicles involved, direction of travel etc.) one or more crash structures may be impacted. At step S106 for each of the one or more crash structures identified, the current stiffness level of the structure is determined. In an embodiment of the invention, during normal operation of the vehicle (i.e. when not involved in a collision) the crash structures have standard stiffness which remains unchanged. In such embodiments the stiffness is stored in the memory of the vehicle. In further embodiments the stiffness of various structures may be actively varied during normal use. For example, the stiffness of the VBS may be adjusted according to driving conditions or style. In such embodiments the current stiffness of the crash structure is measured (for example based on the level of current passed through the piezoelectric polymer) and this value is used.

At step S108 the processor determines the likely distribution of collisional energy between each vehicle as a result of the collision.

In order to determine the likely distribution of collisional energy, input data, as illustrated in FIG. 5 (occupant properties, crash structural properties, predicting system properties and orientation properties) is used, such as the current velocity of the vehicle and mass of the vehicle are identified at step S106 and inputted. Using the data collected at step S102, information regarding the other vehicles in the collision may also be ascertained.

Preferably, the monitoring at step S102 occurs via vehicle-to-vehicle communication and the input data of the second vehicle are transmitted directly to the primary vehicle using the vehicle-to-vehicle communicator. In the event that the secondary vehicle is not equipped with vehicle-to-vehicle communication functionality, at step S108 a determination of the input data properties and likely stiffness of the secondary vehicle is determined. The velocity in an embodiment is measured directly using one or more object detection sensors which are placed on the vehicle. The other properties that need determining, such as crash structural properties of the secondary vehicle are determined using the object recognition camera 18 and the processor which are configured to identify the make and model of the secondary vehicle using known objection detection, or shape detection, techniques. Using a MDLT, the likely mass of the vehicle is then subsequently used in the calculation of the likely collision energy distribution at step S108.

Other methods of estimating the secondary vehicle mass and velocity made in further embodiments are used. Therefore, at step S108 the aggressivity of the collision is determined. As described above the aggressivity of the collision will determine the proportion of the collisional energy as absorbed by each of the vehicles involved in the collision.

The ABC system thereby enables the management of the distribution of the collision energy such that the individual vehicles involved in the collision event absorb a different amount of energy than would occur if no active buckling control were to occur. In a preferred embodiment the stiffness of the crash structures is varied such that the amount of energy absorbed by each vehicle is similar. In further embodiments the amount of energy absorbed by each vehicle is proportional to the input data, such as the masses, maximum deformation values of the vehicles involved, and/or the ability of the crash structure to absorb the energy. Therefore depending on the requirements of the collision and the intended management of the collision the percentage of energy absorbed by each vehicle may be varied.

Therefore, in further embodiments of the invention, the management of the collision event and subsequent stiffening of the crash structures will vary depending on how the aggressivity is managed. At step S110 the initial stiffness is selected as the initial smallest positive eigenvalue $\lambda$. Preferably this is obtained from a pre-calculated MDLT. As such calculations are inherently complex and involve a large number of factors, in order to ensure an effective determination of the initial positive eigenvalue for stiffness the values are pre-calculated and stored as an indexed multidimensional lookup table. Therefore the required stiffness values can be quickly determined based on the information as determined at steps S106. Once the stiffness of the crash structure to be impacted has been determined, the processor 26 emits a control signal in such that the stiffness controller 24 stiffens the crash structure 22 to the determined stiffness. Typically, such stiffening of the crash structure will occur over a time scale of 50 ms.

Therefore at step S110 the ABC system has begun to reduce the aggressivity of the crash by actively varying the stiffness of the crash structure according to the parameters of the vehicles involved in the crash.

Beneficially, the invention continually monitors the collision event in order to ensure an optimal distribution of collision energy between the vehicles. Accordingly, at step S112 the likely collision energy distribution between the two vehicles is updated using the new stiffness values of the crash structure as well as the new values of the velocity of the vehicles involved. Preferably, at step S112 if both vehicles in the collision are equipped with vehicle to vehicle communication ability, the updated stiffness values of the crash structure is transmitted to the other vehicles involved in the collision. Accordingly, a more accurate determination of the likely energy distribution at the point of impact can be made.

In an embodiment where both vehicles are equipped with vehicle-to-vehicle communication ability, one of the vehicles is assigned to be a 'master' vehicle (as discussed earlier), and performs the calculation for the ABC system so as to reduce aggressivity. The second vehicle awaits the results of the calculation which is subsequently transmitted as step S112 via the vehicle to vehicle communicator and acts accordingly so as to stiffen the crash structure at the value given. This ensures that conflicting calculations are not performed by the processor on each vehicle such that the subsequently calculated adapted stiffness values for each crash structure are sub-optimal.

If upon calculating the updated likely collision energy distribution the aggressivity of the impact may be further reduced, new stiffness values are determined using the MDLT and at step S114 the value of the stiffness value of the crash structures is adjusted as appropriate.

Steps S112 and S114 may be iteratively repeated as often as possible before the collision event.

As described at step S114 and S116 the process repeats iteratively in order to determine an optimal stiffness at the point of collision. An aspect of the invention is the ability to refine the stiffness values after the initial calculation of the stiffness value at step S110. The value determined at step S110 represents an initial selection made at the time a collision event is predicted to occur. The subsequent refinement of the eigenvalue of the stiffness of the structure is time limited up to the point of impact, denoted $\Delta t$, during which time further information regarding the collision may be collected—and subsequently used to refine the eigenvalue of the crash structure.

As described above, the energy absorption in a collision is inversely proportional to the VBS stiffness ratio, which relates to the ratio of the buckling eigenvalues. Thus controlling the ratio of the buckling eigenvalues will affect the apportionment of the collision energy of two or more colliding vehicles. Estimates of the colliding vehicle masses, collision velocity and crash structural properties provide estimates of the magnitude of the collision energy, hence the ratios and magnitudes of the smallest positive eigenvalues.

The relative masses determine the ratio of the buckling eigenvalues and the collision velocity determines their magnitude. There are further considerations which need to be taken into account, such as high velocity collisions require structures to be stiffened to protect the occupants, and low velocity collisions require stiffening for self-protection. In both cases energy absorption distribution will be dependent on the controllable stiffness ratios. Therefore at step S114 the refinement of the stiffness of the crash structure ensures an optimal distribution of energy in a collision.

The ABC initially selects the ratio and magnitude via an initial first guess as described at step S110. For a collision involving n vehicles will select n buckling eigenvalues. Whilst the procedure generalises to n vehicles the following detailed description is restricted to n=2 for ease of understanding.

The ABC initially selects the ratio and magnitude via an initial first guess as described at step S110. For a collision involving n vehicles will select n buckling eigenvalues. Whilst the procedure generalises to n vehicles the following detailed description is restricted to n=2 for ease of understanding.

Numerical Example of Invention

The refinement process has two separate considerations, 1) optimising the ratios of the eigenvalues of the affect crash structures, 2) optimising the magnitudes of the determined eigenvalues. Due to the nature of collisions involving a plurality of vehicles there are a number of unknown parameters which need to be estimated. The value of some of these parameters will also change during the course of $\Delta t$ (for example the velocity of one or more vehicles). Preferably the present invention utilises fuzzy logic to determine optimal crash parameters.

The optimisation of the eigenvalues may be broadly described as using a "fuzzy Min operation" to fine tune the eigenvalues via nonlinear interpolation and Centre of Gravity defuzzification. The latter is used in conjunction with an on-board state and parameter estimation scheme, e.g. Kalman filter prediction-correction approach, which provides updated values of the vehicle masses, which is used to fine tune the ratios.

The optimisation of the magnitude of the eigenvalues makes use of an on-board state and parameter estimation scheme, e.g. Kalman filter prediction-correction approach, which, in conjunction with available information from on-board ADAS, e.g. object detection sensors and the object detection camera. This information is continually provided to the system during time $\Delta t$, and thus provides the processor with updated values of the estimated collision velocity, which is used to fine tune the magnitudes of the eigenvalues.

The preferred embodiment utilises the multiple MDLT to perform these optimisation operations.

For the following illustrative example, for clarity only the system properties of velocity and mass of vehicle will be considered.

Figure 8:
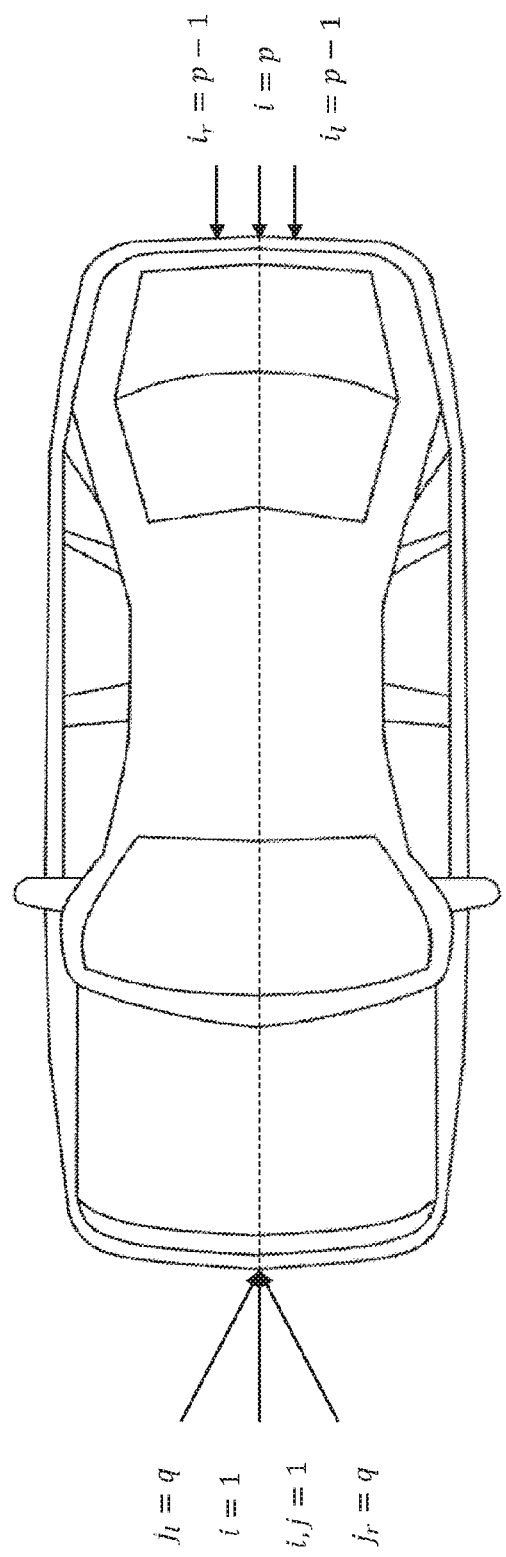
FIG. 8 is a representation of a vehicle and its impact zones.

To consider the orientation of a vehicle, each defined crash structure or overlapping contact frontal, side and rear $i_l=1 \ldots p$, $i_r=1 \ldots p$ (l and r denote left and right respectively) and for each defined angle of impact $j_l=1 \ldots q$, $j_r=1 \ldots q$, (l and r denote the left and right respectively) of a host vehicle, denoted Vehicle A, and a partner vehicle, denoted Vehicle B, there exists a set comprising 2(pq−p−1) MDLTs, noting the symmetry about perpendicular axes when j=1 for i=1 . . . p and the duplication of the central longitudinal axis, where i=1 and i=p, see FIG. 8.

Each MDLT contains pre-calculated values of collision energy corresponding to host and partner vehicle mass, denoted $m_a$ and $m_b$, respectively, and collision velocity, denoted $V_c$, where $m_0 < m_a \le m_\infty$
$m_0 < m_b \le m_\infty$ in which $m_\infty$ and $m_0$ are upper and lower limits of mass, respectively, and $V_0 < V_c \le V_\infty$ where $V_\infty$ and $V_0$ are upper and lower limits of collision velocity.

In FIG. 8 there is shown, by way of example only, an illustrative example of a full frontal collision case where i=1 and j=1. For each value of $V_c: V_0 < V_c \le V_\infty$ in a preferred embodiment there are defined m=7 arbitrary fuzzy sets for each of the host and partner vehicle. In further embodiments the number of fuzzy sets may vary.

Figure 9:
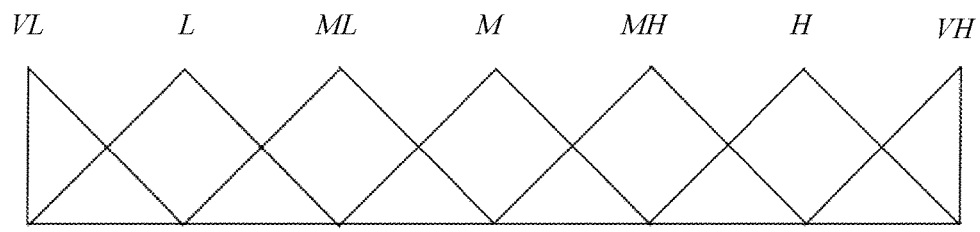
FIG. 9 illustrates a universe of discourse for the fuzzy sets.

In the preferred embodiment the fuzzy sets are termed:
VL Very light
L Light
ML Medium light
M Medium
MH Medium heavy
H Heavy
VH Very Heavy The sets are positioned on the universe of discourse as shown in FIG. 9.

Figure 10:
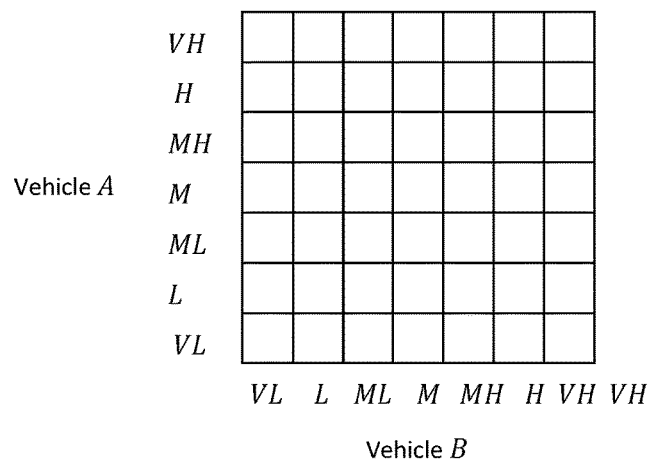
FIG. 10 illustrates a 7×7 array for the multiple vehicles.

Leading to a 7×7 array for each $V_c: V_0 < V_c \le V_\infty$, illustrated in FIG. 10.

For a given value of $V_c$ each element in the array corresponds to a given value of collision energy, denoted $\Delta E$, obtained from the laws of conservation of energy and momentum.

Figure 11:
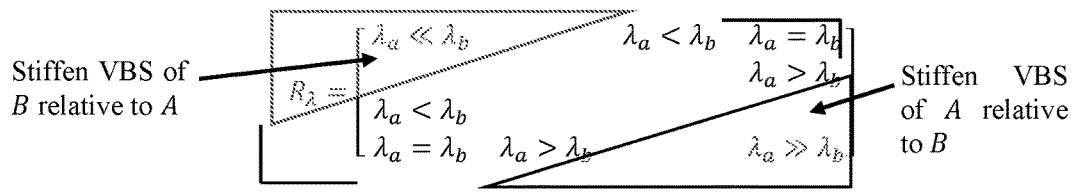
FIG. 11 illustrates a reversal of energy distribution.

As can be derived from these basic principles when $m_a = m_b$ the desired buckling eigenvalues $\lambda_a$ and $\lambda_b$ are also equal. Accordingly it may be deduced that the desired active control or fuzzy rule base matrix, denoted $R_\lambda$, corresponding to the desired of active control to achieve a reversal of the energy distribution will take the form as shown in FIG. 11.

By defining the degree of membership to a general fuzzy set F of a variable x as $\mu F(x)$, so that the vectors of degrees of membership for the variables $m_a$ and $m_b$ to the 7 arbitrary fuzzy sets are as follows:

$$P_{m_a} = \begin{bmatrix} \mu VH(m_a) \\ \mu H(m_a) \\ \mu MH(m_a) \\ \mu M(m_a) \\ \mu ML(m_a) \\ \mu L(m_a) \\ \mu VL(m_a) \end{bmatrix} \triangleq \begin{bmatrix} P_{m_{a_1}} \\ P_{m_{a_2}} \\ P_{m_{a_3}} \\ P_{m_{a_4}} \\ P_{m_{a_5}} \\ P_{m_{a_6}} \\ P_{m_{a_7}} \end{bmatrix} \text{ and } P_{m_b} = \begin{bmatrix} \mu VH(m_b) \\ \mu H(m_b) \\ \mu MH(m_b) \\ \mu M(m_b) \\ \mu ML(m_b) \\ \mu L(m_b) \\ \mu VL(m_b) \end{bmatrix} \triangleq \begin{bmatrix} P_{m_{b_1}} \\ P_{m_{b_2}} \\ P_{m_{b_3}} \\ P_{m_{b_4}} \\ P_{m_{b_5}} \\ P_{m_{b_6}} \\ P_{m_{b_7}} \end{bmatrix}$$

From the vectors $P_{m_a}$ and $P_{m_b}$ a matrix of firing strengths (a measure to which the sets match the inputs) is obtained via a fuzzy minimisation (fuzzy Min) operation $$P_{m_a} \cap P_{m_b} = \text{Min}\{P_{m_a} P_{m_b}\}$$

$$P_{m_a} \cap P_{m_b} = \begin{bmatrix} \text{Min}\{P_{m_{a_1}} P_{m_{b_7}}\} & \text{Min}\{P_{m_{a_1}} P_{m_6}\} & \text{Min}\{P_{m_{a_1}} P_{m_{b_5}}\} & \cdots & \text{Min}\{P_{m_{a_1}} P_{m_{b_1}}\} \\ \text{Min}\{P_{m_{a_2}} P_{m_{b_7}}\} & \text{Min}\{P_{m_{a_2}} P_{m_6}\} & \text{Min}\{P_{m_{a_2}} P_{m_5}\} & \cdots & \text{Min}\{P_{m_{a_2}} P_{m_{b_1}}\} \\ \text{Min}\{P_{m_{a_3}} P_{m_{b_7}}\} & \text{Min}\{P_{m_{a_3}} P_{m_6}\} & \text{Min}\{P_{m_{a_3}} P_{m_5}\} & \cdots & \text{Min}\{P_{m_{a_3}} P_{m_{b_1}}\} \\ \vdots & \vdots & \vdots & \ddots & \vdots \\ \text{Min}\{P_{m_{a_7}} P_{m_{b_7}}\} & \text{Min}\{P_{m_{a_7}} P_{m_{b_6}}\} & \text{Min}\{P_{m_{a_7}} P_{m_5}\} & \cdots & \text{Min}\{P_{m_{a_7}} P_{m_{b_1}}\} \end{bmatrix}$$

Effectively the matrix $P_{m_a} \cap P_{m_b}$ will produce a 4×4 area of influence (which determines the firing strengths)

$$P_{m_a} \cap P_{m_b} = \begin{bmatrix} [+] & [+] \\ [+] & [+] \end{bmatrix}$$

where the 4×4 area of influence overlays the control action rule base matrix to determine the ratio of $\lambda_a : \lambda_b$ which will reverse the energy absorption distribution.

By way of example only, the following is an illustrative collision in which complete energy absorption reversal Consider, a collision event between two vehicles having masses $m_0 = 500$ kg and $m_\infty = 2000$ kg respectively, with the 7 membership functions as before. The corresponding 7×7 array of ratios $\lambda_a : \lambda_b$ is deduced as follows. Define $R_\lambda$ to be the rule base matrix containing the ratios $\lambda_a : \lambda_b$ $$R_\lambda = \begin{bmatrix} 1:4 & 7.5:20 & 1:2 & 12.5:20 & 3:4 & 17.5:20 & 1:1 \\ 15:17.5 & 7.5:17.5 & 10:17.5 & 12.5:17.5 & 15:17.5 & 1:1 & 20:17.5 \\ 1:3 & 1:2 & 2:3 & 12.5:15 & 1:1 & 17.5:15 & 4:3 \\ 5:12.5 & 7.5:12.5 & 10:12.5 & 1:1 & 15:12.5 & 17.5:12.5 & 20:12.5 \\ 1:2 & 7.5:10 & 1:1 & 15:10 & 3:2 & 17.5:10 & 2:1 \\ 5:7.5 & 1:1 & 10:7.5 & 12.5:7.5 & 2:1 & 17.5:7.5 & 20:7.5 \\ 1:1 & 7.5:5 & 2:1 & 12.5:5 & 3:1 & 17.5:5 & 4:1 \end{bmatrix}$$

Now define the matrix $R_{\lambda_a/\lambda_b}$ to be $$R_{\lambda_a/\lambda_b} = \begin{bmatrix} 0.25 & 0.375 & 0.50 & 0.625 & 0.75 & 0.875 & 1.0 \\ 0.286 & 0.429 & 0.571 & 0.714 & 0.857 & 1.0 & 1.429 \\ 0.333 & 0.50 & 0.667 & 0.833 & 1.0 & 1.167 & 1.333 \\ 0.40 & 0.60 & 0.80 & 1.0 & 1.2 & 1.4 & 1.6 \\ 0.50 & 0.75 & 1.0 & 1.25 & 1.50 & 1.75 & 2.0 \\ 0.667 & 1.0 & 1.333 & 1.667 & 2.0 & 2.333 & 2.667 \\ 1.0 & 1.50 & 2.0 & 2.5 & 3.0 & 3.5 & 4.0 \end{bmatrix}$$

Figure 12:
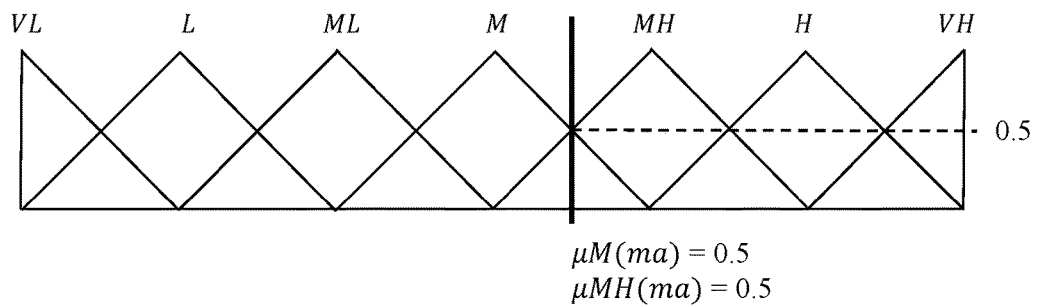
FIG. 12 illustrates a universe of discourse for a vehicle A.
Figure 13:
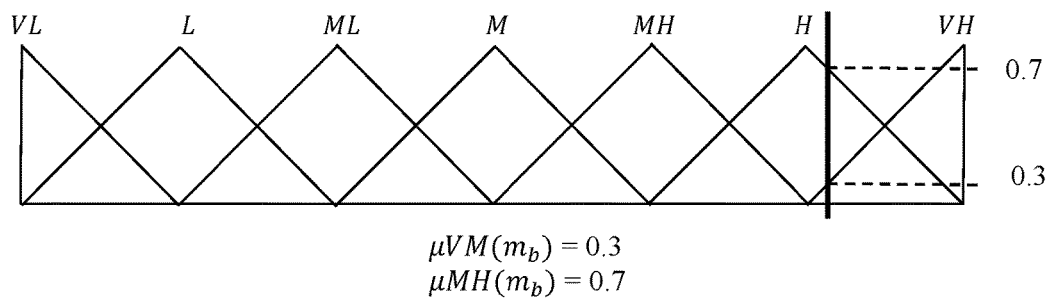
FIG. 13 illustrates a second example of a universe of discourse for different vector values.

Now suppose $P_{m_a}$ and $P_{m_b}$ are found to be:

$$P_{m_a} = \begin{bmatrix} 0 \\ 0 \\ 0.5 \\ 0.5 \\ 0 \\ 0 \\ 0 \end{bmatrix}$$

implying that Vehicle A is half way between Medium Heavy and Medium as shown in FIG. 12 and $$P_{m_b} = \begin{bmatrix} 0.3 \\ 0.7 \\ 0 \\ 0 \\ 0 \\ 0 \\ 0 \end{bmatrix}$$

as shown in FIG. 13.

It follows from $P_{m_a} \cap P_{m_b}$ $$P_{m_a} \cap P_{m_b} = \begin{bmatrix} 0 \\ 0 \\ 0.5 \\ 0.5 \\ 0 \\ 0 \\ 0 \end{bmatrix} \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0.5 & 0.3 \\ 0 & 0 & 0 & 0 & 0 & 0.5 & 0.3 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{bmatrix} [0\ 0\ 0\ 0\ 0\ 0.7\ 0.3]$$

Area of influence

Hence the rule base matrix $R_{\lambda_a/\lambda_b}$ is activated with the firing strengths indicated in $P_{m_a} \cap P_{m_b}$ with the rules $$R_{\lambda_a/\lambda_b} = \begin{bmatrix} 1.167 & 1.333 \\ 1.4 & 1.6 \end{bmatrix}$$

being activated by the Centre of Gravity method $$\frac{\lambda_a}{\lambda_b} = \frac{0.5*1.167 + 0.3*1.333 + 0.5*1.4 + 0.3*1.6}{0.5 + 0.3 + 0.5 + 0.3} = 1.352$$

$\lambda_a:\lambda_b = 1.35:1.0$ which implies that Vehicle A should be stiffened 1.35 times higher than Vehicle B.

The magnitude of the eigenvalues will be dependent on the collision velocity, denoted $V_c$.

Note that the first guess would use the fuzzy Max operation obtained from $$P_{m_a} \cup P_{m_b} = \begin{bmatrix} \text{Max}\{P_{m_{a_1}} P_{m_{b_7}}\} & \text{Max}\{P_{m_{a_1}} P_{m_6}\} & \text{Max}\{P_{m_{a_1}} P_{m_{b_5}}\} & \cdots & \text{Max}\{P_{m_{a_1}} P_{m_{b_1}}\} \\ \text{Max}\{P_{m_{a_2}} P_{m_{b_7}}\} & \text{Max}\{P_{m_{a_2}} P_{m_6}\} & \text{Max}\{P_{m_{a_2}} P_{m_5}\} & \cdots & \text{Max}\{P_{m_{a_2}} P_{m_{b_1}}\} \\ \text{Max}\{P_{m_{a_3}} P_{m_{b_7}}\} & \text{Max}\{P_{m_{a_3}} P_{m_6}\} & \text{Max}\{P_{m_{a_3}} P_{m_5}\} & \cdots & \text{Max}\{P_{m_{a_3}} P_{m_{b_1}}\} \\ \vdots & \vdots & \vdots & \ddots & \vdots \\ \text{Max}\{P_{m_{a_7}} P_{m_{b_7}}\} & \text{Max}\{P_{m_{a_7}} P_{m_{b_6}}\} & \text{Max}\{P_{m_{a_7}} P_{m_5}\} & \cdots & \text{Max}\{P_{m_{a_7}} P_{m_{b_1}}\} \end{bmatrix}$$

which would select the fuzzy rule with the highest firing strength (here 0.7 is the highest) and the higher of the two rules selected $$P_{m_a} \cap P_{m_b} = \begin{bmatrix} 0 \\ 0 \\ 0.5 \\ 0.5 \\ 0 \\ 0 \\ 0 \end{bmatrix} \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0.7 & 0.5 \\ 0 & 0 & 0 & 0 & 0 & 0.7 & 0.5 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{bmatrix} \quad [0 \; 0 \; 0 \; 0 \; 0 \; 0.7 \; 0.3]$$

When this is superimposed on the rule base $R_{\lambda_a/\lambda_b}$ the highest value is selected corresponding to the highest firing strength $$R_{\lambda_a/\lambda_b} = \begin{bmatrix} 1.167 & 1.333 \\ 1.4 & 1.6 \end{bmatrix}$$

Hence a value of 1.4 would have been chosen as the initial first guess (pre-calculated) ratio of $\lambda_a:\lambda_b$. Use of fuzzy MIN operation and Centre of Gravity then provides the first refinement to the ratio.

A similar fuzzy Max operation applies to selecting the value of $\Delta E$ from the nearest (i.e. highest degree of membership) from the fuzzy sets on the universe the discourse corresponding to the collision velocity. The prediced value of $V_c$ will be closest to one of the pre-calculated matrix layers and this value is taken initially, with refinement using the on-board state and parameter estimation scheme and fine tuned using interpolation between the matrix layers of the MDLT. The buckling load is proportional to the total energy to be dissipated, and the ratio of dissipated energy is inversely proportional to the stiffnesses.

Therefore the calculation of the collision energy distribution (and the stiffness of the crash structure) may be further refined in an optimal manner using the above techniques to best determine parameters which at the point of collision will mostly be unknown.

The process can be summarised as thus:
i) Collision avoidance strategies deployed, e.g. collision avoidance, emergency braking
ii) Collision declared imminent via V2V and on-board mass/velocity information exchange/commuted
iii) Activate fuzzy MAX operator on one or both host and partner vehicles to determine the ratio of $\lambda_a:\lambda_b$ and pre-stiffen VBS accordingly
iv) Activate fuzzy MIN operator and Centre of Gravity to fine tune ratio of $\lambda_a:\lambda_b$
v) Via on-board Kaman filter or other state/parameter estimation algorithm fine tune $V_c$, keeping ratio $\lambda_a:\lambda_b$ as in iv) fine tune the relative magnitudes
vi) Repeat v) as appropriate up to a finite time $\Delta t$ before collision
vii) Freeze $\lambda_a$ and $\lambda_b$ at time $\Delta t$ before actual collision Therefore, the present invention allows for a collision to be managed in such a manner that the energy distribution between two or more vehicles is controlled to reduce, or manage, any potential imbalance in the energy distribution. Thus the invention reduces the effect of the aggressivity of a crash where a heavier vehicle (which would typically be configured to absorb more energy without permanent damage) would normally absorb less energy than a lighter vehicle (which is typically able to absorb less energy). Thus the imbalance between the energy absorbed by the vehicles is reduced. Further as the stiffness of the crash structures is variable the weight of the crash structure is reduced as less material is required. This has advantages in fuel saving (as the vehicles weigh less) whilst being able to provide a safe structure (as the crash structure is able to stiffen at the time of impact).

We claim:

1. A method of managing collisions between a plurality of vehicles in an active collision management system, wherein one or more of the vehicles has a crash structure whose stiffness can be adjusted and one or more object detection sensors, the method comprising the steps of:
    determining whether a collision event between the plurality of vehicles is to occur based on data measured by one or more object detection sensors; and in the event that a collision event is to occur,
    for a first vehicle involved in the collision event:
        identifying a first crash structure and
        determining an initial stiffness of the crash structure; and subsequently
        determining a level of aggressivity of the collision based on a calculation of the imbalance of the predicted energy absorptions for each of the plurality of vehicles as result of the collision, wherein the step of determining the aggressivity comprises the steps of:
predicting an initial mass or velocity of a plurality of the vehicles involved in the collision based on information received from one or more object detection sensors; and
calculating the energy absorption for each vehicle based on the input data (occupant properties, crash structural properties and orientation properties) and predicted mass or velocity;
determining a subsequent stiffness value for the first crush structure based on the
predicted energy absorption and level of aggressivity of the collision such that the calculated energy absorbed by the crash structure is changed and the level of aggressivity of the collision between the plurality of vehicles is reduced, such that the imbalance between the amount of collision energy absorbed by each vehicle is reduced; and
stiffening the first crash structure to the subsequently determined stiffness value.

2. The method of claim 1 wherein the method further comprises:
for the subsequently calculated stiffness value for the first crash structure determining a level of aggressivity of the collision for the collision based on the subsequently calculated stiffness value based on a further calculation of the imbalance of the predicted energy absorptions for each of the plurality of vehicles as result of the collision, and
determining a new stiffness value for the crash structure such that the imbalance between the amount of collision energy absorbed by each vehicle is further reduced.

3. The method of claim 2 wherein the prediction, such as the mass of the vehicles is based on information received from an object recognition camera and the method further comprises the step of determining a likely make and model, and properties such as mass and maximum crash structure deformation, of the vehicle from the information received by the object recognition camera.

4. The method of claim 1 further comprising the step of the first vehicle initiating communication with a second vehicle via a vehicle to vehicle communicator; and
the second vehicle communicating to the first vehicle the mass or velocity of the second vehicle.

5. The method of claim 1 wherein the initial stiffness of the first crash structure is based on modal structural modelling of the crash structure and vehicle and the minimisation of the eigenvalue of the crash structure.

6. The method of claim 5 wherein the determination of the subsequent stiffness of the crash structure comprises the steps of:
optimising the ratios of the eigenvalue of the crash structure
optimising the magnitude of the optimised eigenvalue.

7. The method of claim 6 where the optimisation of the ratio of the eigenvalue and magnitude of the optimised occurs using multi-dimensional look up tables.

8. The method of claim 1 wherein the subsequent stiffness is determined based on in part on using subsequently determined vehicle masses or velocities.

9. The method of claim 8 wherein the subsequently determined masses or velocities are predicted using prediction correction algorithm.

10. The method of claim 9 wherein the prediction correction algorithm is a Kalman filter.

11. The method of claim 1 wherein the steps of identifying a crash structure and the subsequent variation of the stiffness of the crash structure is repeated for one or more further vehicles.

12. The method of claim 1 wherein one or more further crash structures are identified and their stiffness varied so as to reduce the agressivity of the collision.

13. The method of claim 12 wherein the ratio of the eigenvalues between two crash structures is varied to reduce the aggressivity of the collision.

14. The method of claim 13 wherein the ratio of eigenvalues is varied using fuzzy logic to determine a desired ratio in order to reduce aggressivity.

15. The method of claim 1 wherein the crash structure comprises a portion made of one or more of a: piezoelectric polymer, shape memory alloy, magnetorheological material.

16. A vehicle having an active buckling system stored thereon, the vehicle comprising:
a first crash structure having a portion of an actively controlled material configured to vary in stiffness;
a first object detection sensor;
an on board processor, the on-board processor configured to:
determine whether a collision event between the vehicle and a second vehicle is to occur based on data measured by the first object detection sensor; and in the event that a collision event is to occur,
determine an initial stiffness of the first crash structure;
determine a level of aggressivity of the collision based on a calculation of the imbalance of the predicted energy absorptions for each of the plurality of vehicles as result of the collision for the first and second vehicles wherein the determination of the aggressivity comprises:
predicting an initial mass or velocity of a plurality of the vehicles involved in the collision based on information received from one or more object detection sensors; and
calculating the energy absorption for each vehicle based on the input data (occupant properties, crash structural properties and orientation properties) and predicted mass or velocity;
determine a subsequent stiffness value for the first crash structure based on the predicted energy absorption and level of aggressivity of the collision such that the calculated energy absorbed by the crash structure is changed and the level of aggressivity of the collision between the plurality of vehicles is reduced, such that the imbalance between the amount of collision energy absorbed by each vehicle is reduced; and
send a control signal to stiffen the first crash structure to the subsequently determined stiffness value.

17. The vehicle of claim 16 wherein the processor is configured to perform the steps of the method of claim 1.

18. A computer readable medium having instructions stored thereon which when executed on a processor cause the processor to execute the steps of claim 1.

* * * * *